US011241664B1

(12) United States Patent
Feick

(10) Patent No.: US 11,241,664 B1
(45) Date of Patent: Feb. 8, 2022

(54) APPARATUS FOR STARTING THE FLOW OF A COMPACTED MATERIAL FROM A HOPPER TRAILER

(71) Applicant: Feick Farms, LTD, Fontanelle, IA (US)

(72) Inventor: Steve Feick, Fontanelle, IA (US)

(73) Assignee: Feick Farms, LTD, Fontanelle, IA (US)

( * ) Notice: Subject to any disclaimer, the term of this patent is extended or adjusted under 35 U.S.C. 154(b) by 764 days.

(21) Appl. No.: 16/046,622

(22) Filed: Jul. 26, 2018

(51) Int. Cl.
B65G 65/46 (2006.01)
B01F 15/02 (2006.01)
B01F 13/00 (2006.01)
B01F 7/02 (2006.01)
B60P 1/56 (2006.01)
B65D 88/68 (2006.01)
B65G 33/08 (2006.01)

(52) U.S. Cl.
CPC .......... *B01F 15/0289* (2013.01); *B01F 7/021* (2013.01); *B01F 13/004* (2013.01); *B60P 1/56* (2013.01); *B65D 88/68* (2013.01); *B65G 33/08* (2013.01); *B65G 65/463* (2013.01)

(58) Field of Classification Search
CPC ........ B65G 33/08; B65G 33/32; B65G 65/46; B65G 65/463; B65G 65/466; B65G 67/24; B65G 88/68; B60P 1/40; B60P 1/42; B01G 7/002; B01G 7/0025; B01G 7/021; B01G 7/00941; B01G 13/0035; B01G 13/004
USPC .......................... 198/657, 674, 677; 414/526
See application file for complete search history.

(56) References Cited

U.S. PATENT DOCUMENTS 3,067,914 A * 12/1962 Ellaby ................... B65G 65/463
222/227
3,610,482 A * 10/1971 Van Steenburgh, Jr. ....................
F25C 5/20
222/403
3,717,272 A * 2/1973 Chartier ............... A01C 15/003
414/472
3,799,917 A * 3/1974 Rathke ..................... B01F 7/302
526/88
4,057,226 A * 11/1977 de Mos ...................... B01F 7/02
366/244
4,217,996 A * 8/1980 Good ........................ B01F 5/24
222/404

(Continued)

FOREIGN PATENT DOCUMENTS

CN 203569891 4/2014
CN 204382693 6/2015
(Continued)

*Primary Examiner* — Joseph A Dillon, Jr.
(74) *Attorney, Agent, or Firm* — Brick Gentry PC; Brian J. Laurenzo; Jessica L. Susie

(57) ABSTRACT

An apparatus for starting the flow of a compacted material from a hopper trailer is disclosed. The apparatus may include a means of substantially joining the apparatus with the rim of a hopper trailer, an auger shaft having flighting, and a means of turning said shaft on a longitudinal axis in order to displace compacted material and initiate the flow of same. In one embodiment, the auger shaft consists of an internal shaft capable of receiving segmented sleeves having flighting in order to allow for compatibility with a wide variety of hopper trailers. In another embodiment, the drive means of the apparatus may be operated by wireless control.

8 Claims, 8 Drawing Sheets

(56) References Cited

U.S. PATENT DOCUMENTS

| | | | | |
|---|---|---|---|---|
| 4,322,021 | A * | 3/1982 | Olsson | B65G 65/463 198/531 |
| 4,365,730 | A * | 12/1982 | Ezban | B65G 65/463 193/12 |
| 4,415,303 | A * | 11/1983 | Westendorf | B60P 1/40 198/536 |
| 4,437,767 | A * | 3/1984 | Hargis | B01F 15/00707 366/287 |
| 4,552,462 | A * | 11/1985 | Schnell | D21D 5/28 366/280 |
| 4,597,134 | A | 7/1986 | Wagner | |
| 4,974,751 | A * | 12/1990 | King | A47F 1/03 222/134 |
| 5,340,265 | A * | 8/1994 | Grieshop | B60P 1/40 414/519 |
| 5,409,344 | A * | 4/1995 | Tharaldson | B60P 1/42 198/314 |
| 5,649,765 | A * | 7/1997 | Stokes | B01F 7/00925 366/287 |
| 6,237,815 | B1 * | 5/2001 | Schlosser | B65B 39/004 222/241 |
| 6,497,546 | B2 | 12/2002 | Wood et al. | |
| 10,974,916 | B2 * | 4/2021 | Turle | B65G 65/4836 |
| 2005/0155667 | A1 * | 7/2005 | Stegemoeller | B65B 37/10 141/67 |
| 2007/0029004 | A1 * | 2/2007 | Rhee | G03G 15/0877 141/256 |
| 2008/0095599 | A1 * | 4/2008 | Hahn | B60P 1/42 414/526 |
| 2008/0099310 | A1 * | 5/2008 | Olds | B65G 33/20 198/671 |
| 2013/0302117 | A1 * | 11/2013 | Yu | B65D 88/68 414/301 |
| 2017/0334655 | A1 * | 11/2017 | Nichol | B65G 33/08 |
| 2019/0062078 | A1 * | 2/2019 | Grenvik | B65G 65/466 |
| 2020/0154641 | A1 * | 5/2020 | Van Mill | B60P 1/40 |
| 2020/0361726 | A1 * | 11/2020 | Olson | B65G 65/466 |

FOREIGN PATENT DOCUMENTS

| | | |
|---|---|---|
| CN | 205939244 | 2/2017 |
| CN | 107551666 | 1/2018 |
| WO | 8809614 | 12/1988 |

* cited by examiner

APPARATUS FOR STARTING THE FLOW OF A COMPACTED MATERIAL FROM A HOPPER TRAILER

FIELD OF THE INVENTION

The present invention relates generally to agricultural equipment used in the removal of agricultural products. More specifically, the present invention relates to the reliable discharge of materials from a hopper trailer. To that end, the present invention relates to an apparatus capable of displacing compacted material in order to initiate flow the flow of the same from a hopper trailer outlet. The apparatus of the present invention is capable of being easily retrofitted to existing hopper trailers of standard and non-standard dimensions.

BACKGROUND

In the agricultural industry, the delivery and deposit of compacted materials is a difficult and time consuming process. In particular, the unloading of fine materials from a hopper trailer is unnecessarily time consuming and inefficient. Modern hopper trailers comprise a bin, generally in the shape of a rectangular prism, with an open top comprising an interior rim and positioned upon a trailer frame with wheels. Additionally, when in use, hopper trailers are loaded from the top and unloaded from a bottom outlet into a permanent or semi-permanent destination, such as a grain elevator, biofuel plant, or grain bin. For many materials, the pull of gravity is sufficient to achieve timely and consistent discharge. However, some materials are so fine that they may become compacted to the point where gravity alone cannot start the flow from the hopper outlet.

Generally, the task of transporting and depositing the materials is performed by a single person. In instances where the materials have become compacted such that flow cannot be realized, the individual tasked with transporting and depositing the materials must employ some method of manually initiating flow. Most often, those transporting the materials must use their vehicles to rock the material back and forth in order to manually initiate flow. However, this method is unreliable and may result in inaccurate deposit. As a result, unloading such material is time consuming, inefficient and often causes material to be wasted.

Attempts have been made using vibrating panels or other devices to start the flow of material; however, all have proven unreliable in initiating a consistent flow. Furthermore, devices of the prior art are inefficient and impractical for modern usages. For example, International Publication No. WO 88/09614 is directed to an apparatus for dispensing stock feed. The disclosed apparatus employs a towed wheeled frame carrying a conical hopper. A vertical drive shaft passes through an outlet chamber and is connected by a universal joint to the shaft of an oblique travelling auger lying adjacent to the inside face of the hopper. The top of the traveling auger shaft features an inner friction wheel bearing inside the rim of the hopper and brackets carrying outer friction wheels which are spring-loaded against the outside rim of the hopper. The hopper apparatus of International Publication No. WO 88/09614 has drawbacks. The travelling auger's connection to the universal joint at the hopper outlet has the effect of limiting the hopper to a conical shape which is undesirable in the modern agricultural industry. Specifically, the use of a conical hopper severely reduces the volume of grain that may be carried and subsequently discharged per square foot of trailer space when compared to modern, rectangular hopper trailers. Moreover, a conical hopper elevates the center of mass by distributing the carried mass vertically and exponentially. To illustrate, when compared to modern hopper trailers having the shape of a rectangular prism being positioned longitudinally, a conical hopper of the same height has a fifty percent higher center of mass. As grain must often be transported over highways at high speeds in hopper trailers, raising the center of mass increases the danger of rollover and diminishes the transporter's ability to control the vehicle carrying the apparatus. What's more, the height required of a trailer bearing conical hoppers is greater than that of a rectangular hopper carrying the same volume. In some instances, highway regulations may require additional fees, permits, or restrictions in the transportation of taller hopper trailers. As such, a conical hopper is undesirable.

As previously discussed, modern trailer hoppers have rectangular box shapes with shallow walls sloping towards the hopper outlet. Accordingly, because the auger disclosed is of a fixed length and is incapable of navigating corners, the apparatus disclosed could not be utilized in a modern hopper trailer. Furthermore, in transporting grain, it is desirable to protect the agricultural materials from moisture and wind. In protecting the materials, a rigid or flexible covering is attached in order to effectively seal the top of the hopper trailer. Because the apparatus disclosed comprises two friction wheels traveling the inner and outer surfaces of the rim of the hopper in tandem, a covering of the type described could not be used. The drive shaft system implemented by the disclosed apparatus also presents drawbacks. As disclosed in the publication, the drive shaft is driven by the spin of its wheels as the apparatus is moved forward or backward. The referenced publication teaches the advantages of these drive means in distributing material in continuous lines or rows. Accordingly, because operation of the apparatus depends on the movement of the hopper trailer, the disclosed drive means would be incapable of functioning to deposit the materials while stationary. Additionally, there are further draw backs to the disclosed drive shaft system. Specifically, placing the shaft with fighting through the hopper outlet reduces the area through which material could flow. What's more, the overall pervasive design of the drive means of the disclosed apparatus may not be easily retrofitted to modern, non-conical hoppers. Furthermore, because the shaft must extend through the hopper outlet to connect with the drive means, the outlet cannot be closed. Such a hopper trailer incapable of closure could not be used to transport materials as such material would escape through the outlet and be wasted.

Accordingly, there is a need in the art for an apparatus for starting the flow of a compacted material from a modern hopper trailer. Furthermore, the apparatus should be capable of creating a cavity to assist in the discharge of the grain through a hopper outlet. There is further need in the art for an apparatus that can easily and reliably initiate the flow of compacted materials with minimal effort. Such an apparatus should be capable of functioning with modern hopper trailers. Additionally, such an apparatus should be capable of being easily added to existing standard and non-standard hopper trailers. Other objects and advantages of the invention will be apparent from the drawings and detailed description to follow.

SUMMARY

The present invention provides an apparatus for starting the flow of a compacted material from a hopper trailer that is readily customizable and capable of being retrofitted to various standard and non-standard hopper trailers. In one embodiment of the invention, the apparatus for starting the flow of a compacted material from a hopper trailer may include a first bracket capable of being substantially joined with the rim of a hopper trailer. Also included may be drive means, the drive means capable of being substantially joined with the first bracket. Further, an auger shaft extending downwardly towards the bottom of a hopper trailer may be included. The auger shaft is capable of being substantially joined with the drive means so as to turn the auger shaft, thereby causing a cavity to form in compacted materials and starting the flow of such compacted materials. The application of an auger shaft in the present invention is unique in view of traditional auger use in the agricultural industry. Traditional usages entail using the auger shaft within a tubular enclosure to push material along a horizontal or elevated trajectory against the force of gravity. The use of an auger shaft in the present invention is distinct from these traditional usages in that the auger shaft bears no enclosure and is primarily used to bore a cavity into the material in order to assist gravitational forces, rather than overcome them, in the discharge of the material contained within the hopper trailer. Such an application is counterintuitive to traditional auger usages and does not interfere with the function of the hopper trailer in which it is used.

In another embodiment of the invention, the drive means may be substantially joined with a joint capable of being substantially joined with the first bracket of the apparatus for starting the flow of a compacted material from a hopper trailer. Further, the auger shaft may include fighting capable of displacing a large volume of compacted materials. The apparatus for starting the flow of a compacted material from a hopper trailer may also include a second bracket capable of receiving the auger shaft at a variety of angles and being substantially joined with the interior of the hopper trailer.

In the preferred embodiment of the invention, an apparatus for starting the flow of a compacted material from a hopper trailer includes a first bracket having an upper portion capable of being substantially joined with the rim of a hopper trailer and a lower portion extending downwardly. The upper portion of the first bracket may include first, second and third sides. The first, second and third sides may be positioned such that the first and second sides are parallel to each other and the third side may be attached perpendicular to the bottom edges of both the first and second sides. The lower portion of the first bracket may include at least first and second sides extending downwardly. The first and second sides may be positioned such that the first side is parallel to the second side with both sides having identical elevation relative to the ground. The preferred embodiment additionally includes a joint. Both the first and second sides of the lower portion of the first bracket have slots being parallel to one another and extending upwardly for the purpose of receiving the joint. Further, a drive means may be included that is capable of being substantially joined with the joint. The apparatus for starting the flow of a compacted material from a hopper trailer may further include an auger shaft extending downwardly towards the bottom of the interior of the hopper trailer. The auger shaft may comprise an internal shaft capable of receiving and securing segmented sleeves having fighting. The auger shaft may be substantially joined with the drive means of the apparatus such that the drive means are capable of turning the auger shaft along a longitudinal axis. The apparatus for starting the flow of a compacted material from a hopper trailer may also include a second bracket capable of receiving an auger shaft at a variety of angles.

The preferred embodiment of the invention may also include means of adjusting the upper portion of the first bracket so as to be capable of being substantially joined with hopper trailer rims of various thicknesses. The preferred embodiment may additionally include drive means capable of starting and ceasing operation by wireless controls. In the preferred embodiment the second bracket may be placed on the side of the hopper outlet opposite of the first bracket such that the apparatus passes over the center of the hopper outlet. Furthermore, the slots of the first and second sides of the lower portion of the first bracket may be capable of receiving the joint such that the joint may be freely adjusted to multiple angles. The use of a freely adjustable joint in conjunction with a second bracket capable of receiving an auger shaft at a variety of angles allows for the apparatus to be fitted to existing hopper trailers regardless of their dimension and with relative ease of installation. Additionally, the use of an auger shaft comprising an internal shaft capable of receiving and securing segmented sleeves further allows for easy manufacturing and customization of auger shaft length to ensure compatibility with a wide range of existing hopper trailers.

DETAILED DESCRIPTION

The following is a detailed description of an embodiment of an apparatus for starting the flow of a compacted material from a hopper trailer 100 (sometimes "apparatus"). One particular use of such an apparatus 100 is to disturb dried distillers grain that has become compacted in order to initiate flow of the same from a hopper trailer outlet 306. Another particular feature of such an apparatus 100 is the ease of customization and installation that allows for compatibility with a wide range of standard and non-standard hopper trailers 300. Oftentimes, the detailed description will refer to material as being compacted. However, it should be appreciated that the present invention may additionally be used with material that is not compacted. Further, the detailed description may refer to a material that is a grain, however, it should be appreciated that the present invention is for use with any material.

Figure 1:
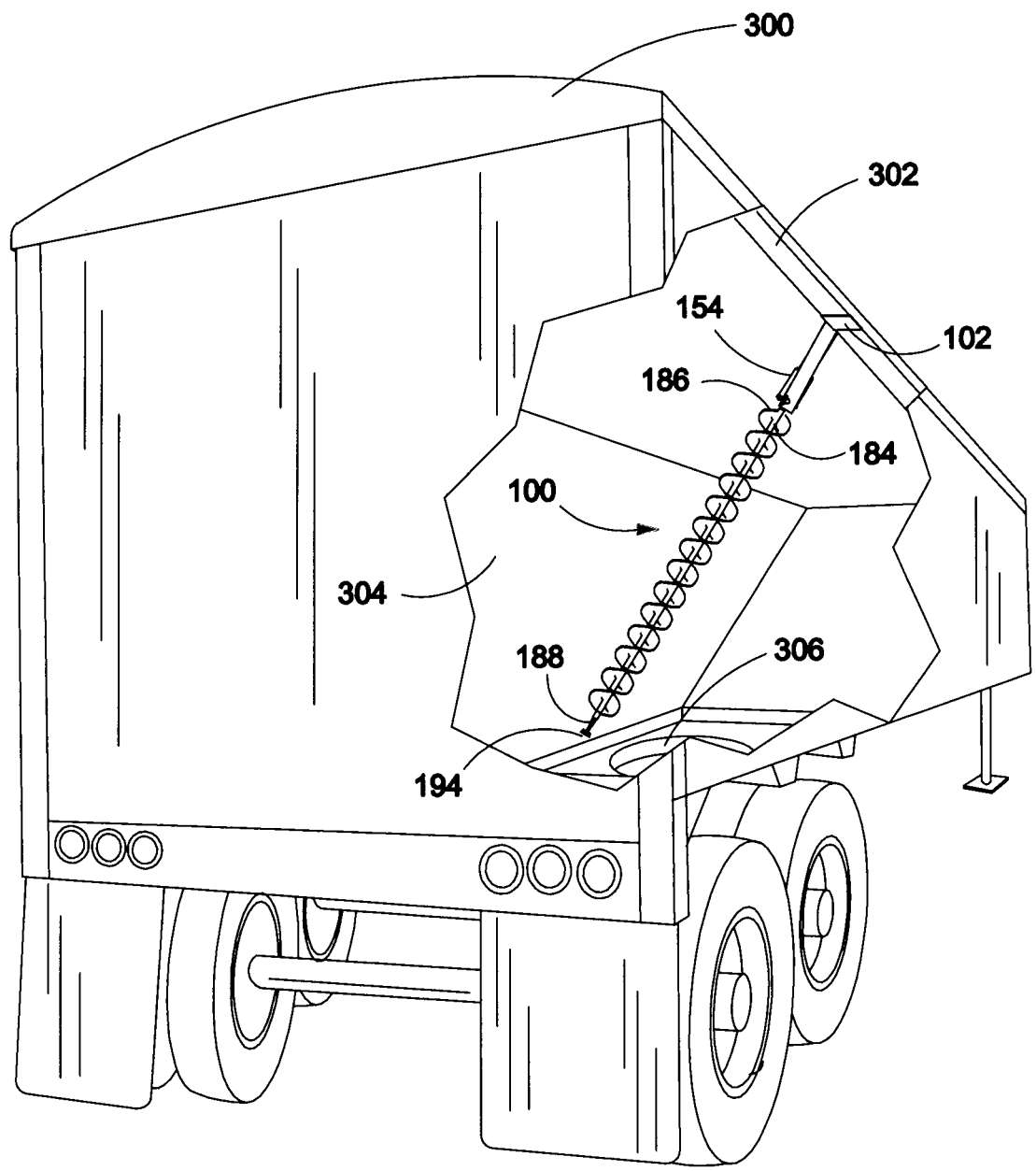
FIG. 1 is a perspective cut away view according to the preferred embodiment of the apparatus of the present invention as installed in a hopper trailer.
Figure 2:
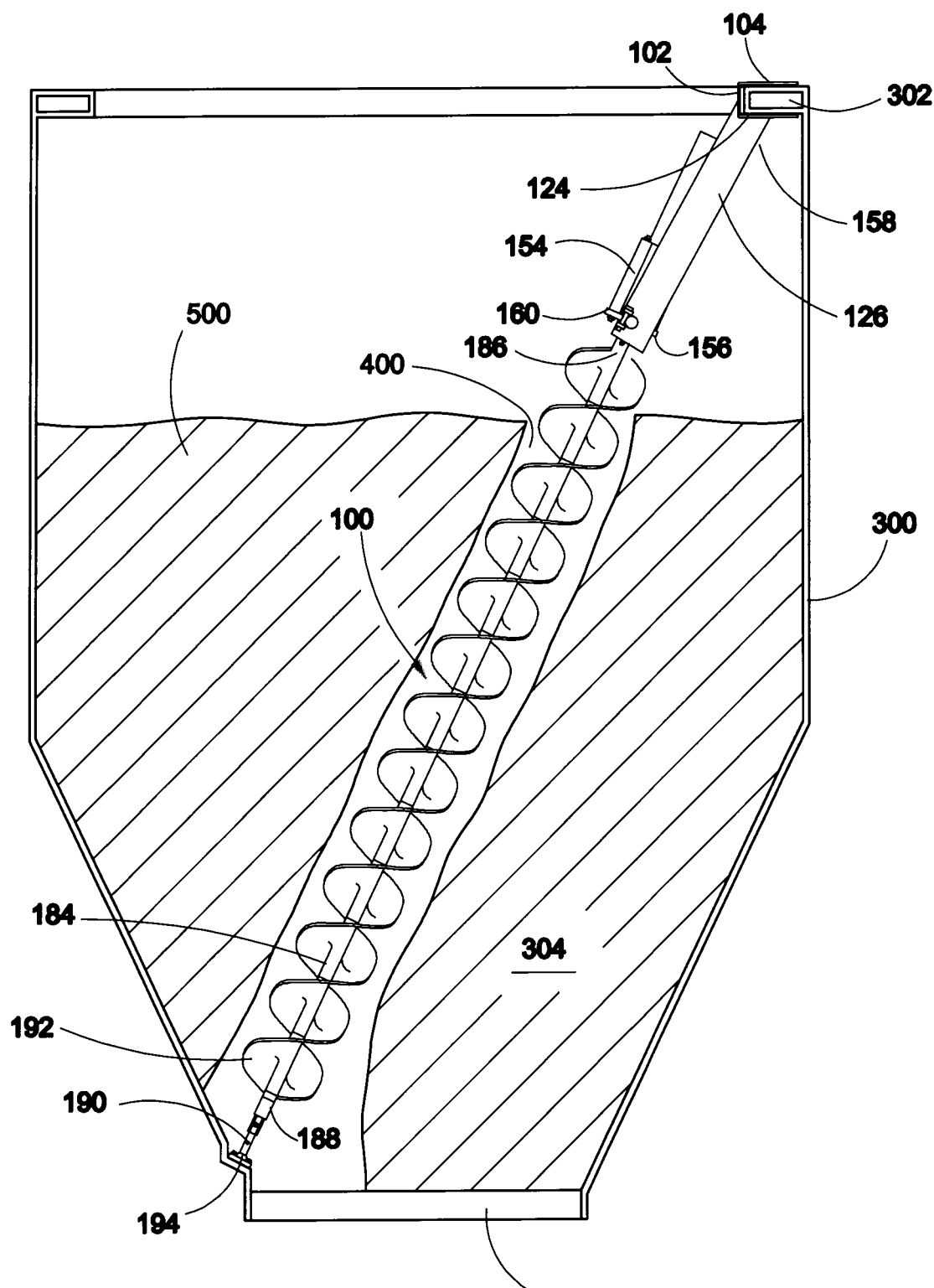
FIG. 2 is a side elevation view of the preferred embodiment of the apparatus as used with a hopper trailer containing materials and showing the cavity formed therein as a result of operation.

Referring to FIG. 1, an apparatus 100 for starting the flow of a compacted material from a hopper trailer is shown. In the illustrated embodiment, the apparatus 100 includes a first bracket 102 capable of being substantially joined with the hopper trailer 300. As is known in the art, a hopper trailer 300 for agricultural use is a large, portable storage bin that may be subdivided into compartmentalized sections. Modern hopper trailers typically take the shape of a rectangular prism being positioned longitudinally, having four walls that slope downwards towards where an outlet is located, and open tops having a rim 302 that extends toward the interior. Hopper trailers further include wheels suitable for transportation across highways and roads and are pulled by semi-trucks. When used to store and transport material, the hopper trailer 300 of the present invention is loaded through the top and emptied through the bottom by way of a hopper trailer outlet 306. The apparatus 100 depicted in FIG. 1 further includes a drive means 154 substantially joined with the first bracket 102. Also comprising the apparatus 100 is an auger shaft 184 having an upper end 186 and a lower end 188. The upper end 186 of the auger shaft 184 is substantially joined with the drive means 154, which is shown in further detail in FIG. 5A. Operation of the drive means 154 causes longitudinal rotation of the auger shaft 184. Referring to FIG. 2, when the hopper trailer 300 is filled with materials 500 the longitudinal rotation of the auger shaft 184 causes a cavity 400 to be formed therein and displaces the materials 500. The lower end 188 of the auger shaft 184 is substantially joined with a second bracket 194 (also shown in FIGS. 2, 3, and 4). As shown in the illustrated embodiment, the second bracket 194 is substantially joined with the interior of the hopper trailer 304 by standard bolts. However, it should be appreciated by those skilled in the art that any means may be used in order to substantially join the second bracket 194 with the interior of the hopper trailer 304 without departing from the scope of the invention.

Figure 3:
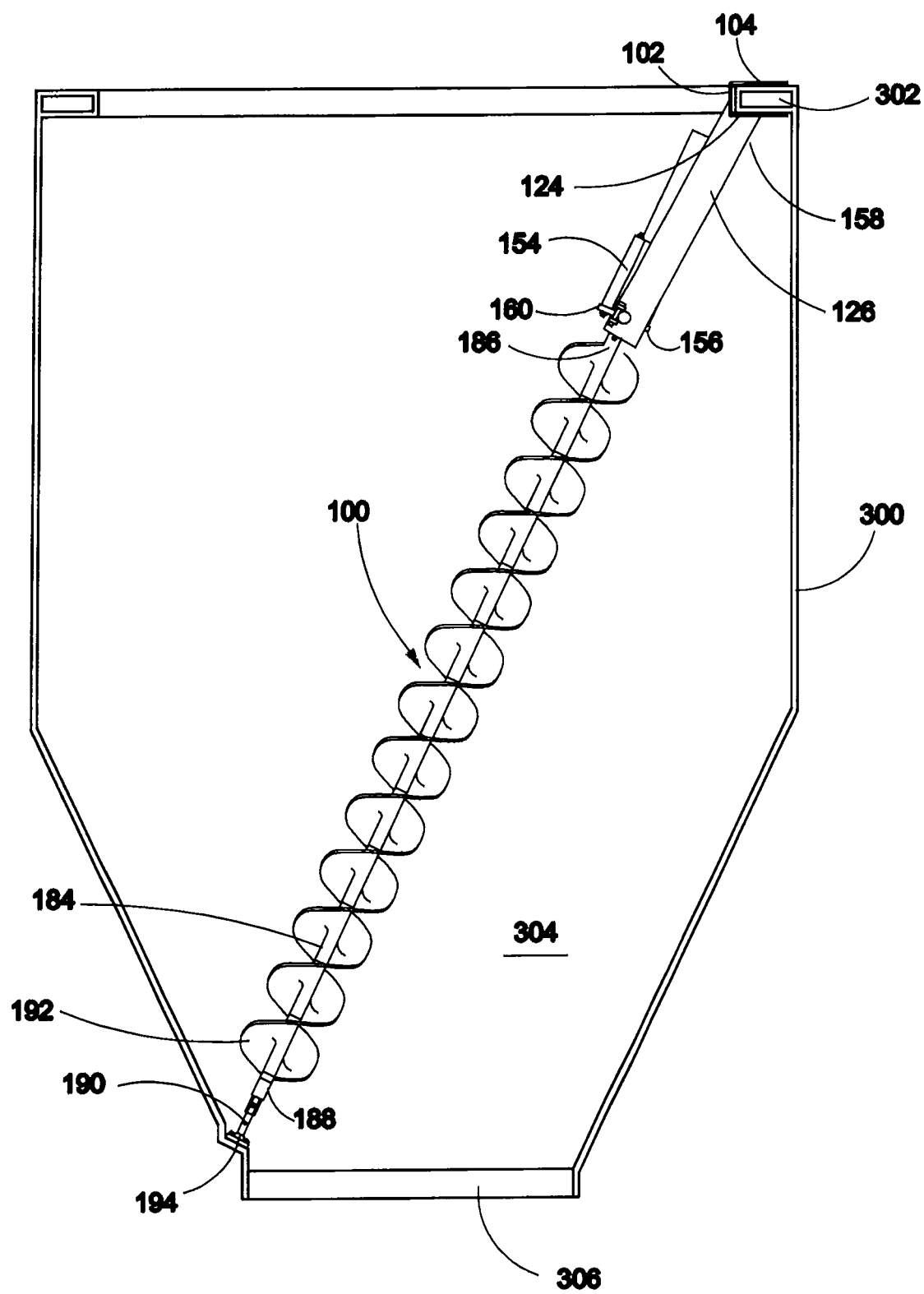
FIG. 3 is a side elevation view of the apparatus of Star 2. wherein the first side of the lower portion of the first bracket is removed to show a side view of the joint.

Referring to FIGS. 2 and 3 which illustrate the preferred embodiment of the invention, an adjustable apparatus 100 for starting the flow of a compacted material from a hopper trailer is shown. The apparatus 100 includes a first bracket 102 having an upper portion 104 and a lower portion 124 (shown in further detail in FIG. 6), a drive means 154, a joint 160, an auger shaft 184 having an upper end 186 and a lower end 188, and a second bracket 194. As shown in FIG. 2, the upper portion 104 of the first bracket 102 is substantially joined with the rim 302 of the hopper trailer 300. Further, in the preferred embodiment, the lower portion 124 of the first bracket 102 is substantially joined with a joint 160. The joint 160 is then substantially joined with the drive means 154. The upper end 186 of the auger shaft 184 is substantially joined with the drive means 154. Further, the lower end 188 of the auger shaft 184 is substantially joined with the bottom of the hopper trailer 304 with a second bracket 194. In the illustrated embodiment, the apparatus 100 is shown installed in a hopper trailer 300.

Figure 6:
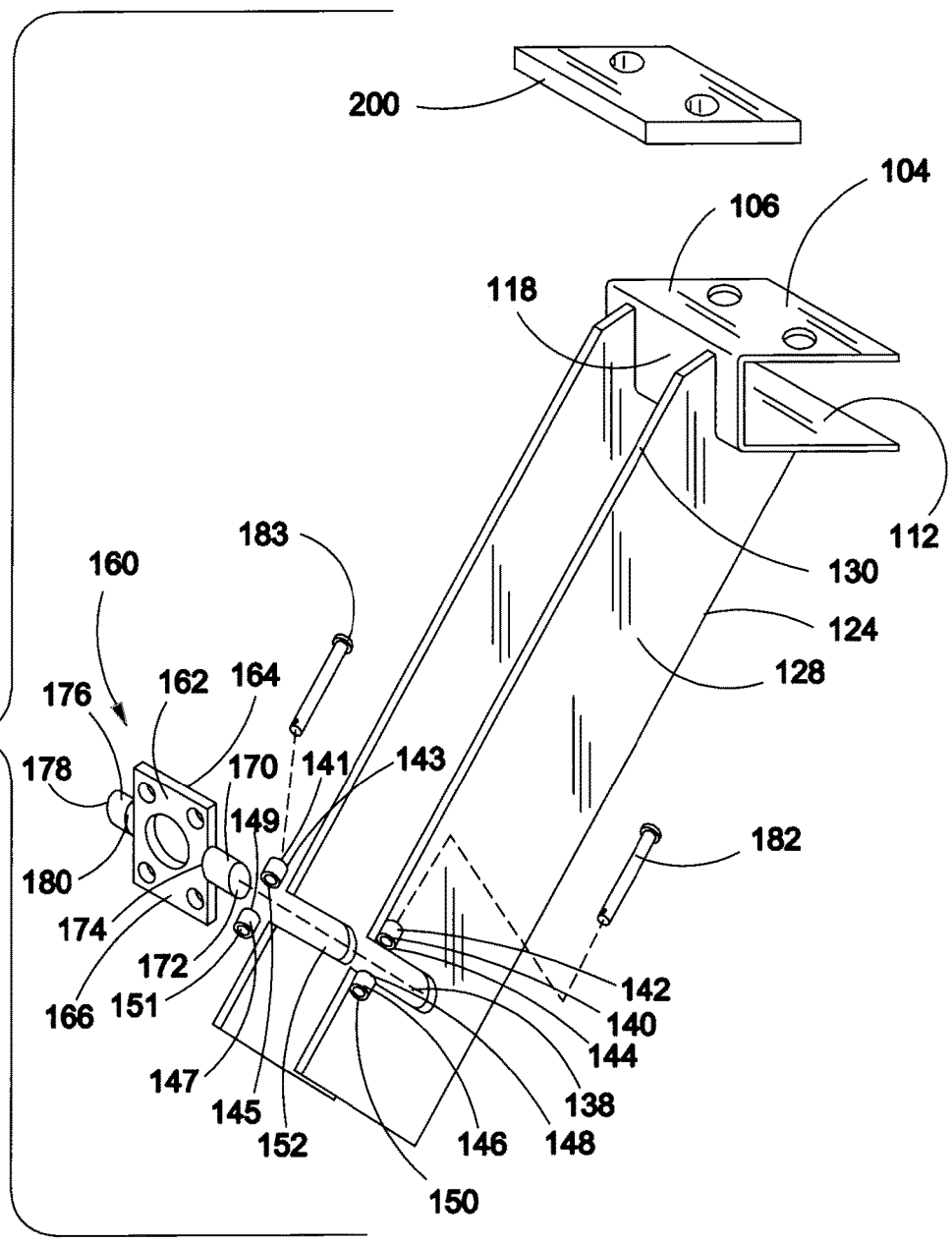
FIG. 6 is an exploded view of the first bracket and the joint of the apparatus.

Referring to FIG. 6 showing an exploded view of the first bracket 102 and the joint 160 of the preferred embodiment of the invention, the upper portion of the first bracket 104 comprises a first side 106 having an inner surface 110 and an outer surface 108, a second side 112 having an inner surface 114 and an outer surface 116, and a third side 118 having an inner surface 122 and an outer surface 120. The first side 106 of the upper portion of the first bracket 104 extends parallel and laterally above the second side 112 with the inner surface 110 of the first side 106 being proximal to the inner surface 114 of the second side 112. The third side 118 of the upper portion of the first bracket 104 is substantially joined with the first side 106 and the second side 112. The upper portion 104 of the first bracket 102 may then be substantially joined with the rim of the hopper trailer 302 by positioning the upper portion 104 such that the inner surface of the first side 110, the inner surface of the second side 114, and the inner surface of the third side 122 are more proximal to the rim 302 than the outer surface of the first side 108, the outer surface of the second side 116 and the outer surface of the third side 120. In the illustrated embodiment, the upper 104 portion of the first bracket 102 may be secured to the rim of the hopper trailer 302 with standard bolts. However, it should be appreciated by those skilled in the art that any means sufficient to secure the upper portion 104 to the rim of the hopper trailer 302 may be used without departing from the scope of the invention. Additionally, as shown in FIG. 6, vibration reducing material 200 may be added to the inner surface of the first side 110, the inner surface of the second side 114, and the inner surface of the third side 122 of the upper 104 portion of the first bracket 102 in order to reduce vibration and to allow the upper portion 104 to be substantially joined with hopper trailer rims of various thicknesses. It should be appreciated by those skilled in the art that any material sufficient to reduce vibration or reduce the interior volume of the upper portion 104 of the first bracket 102 may be used without departing from the scope of the invention.

Figure 4:
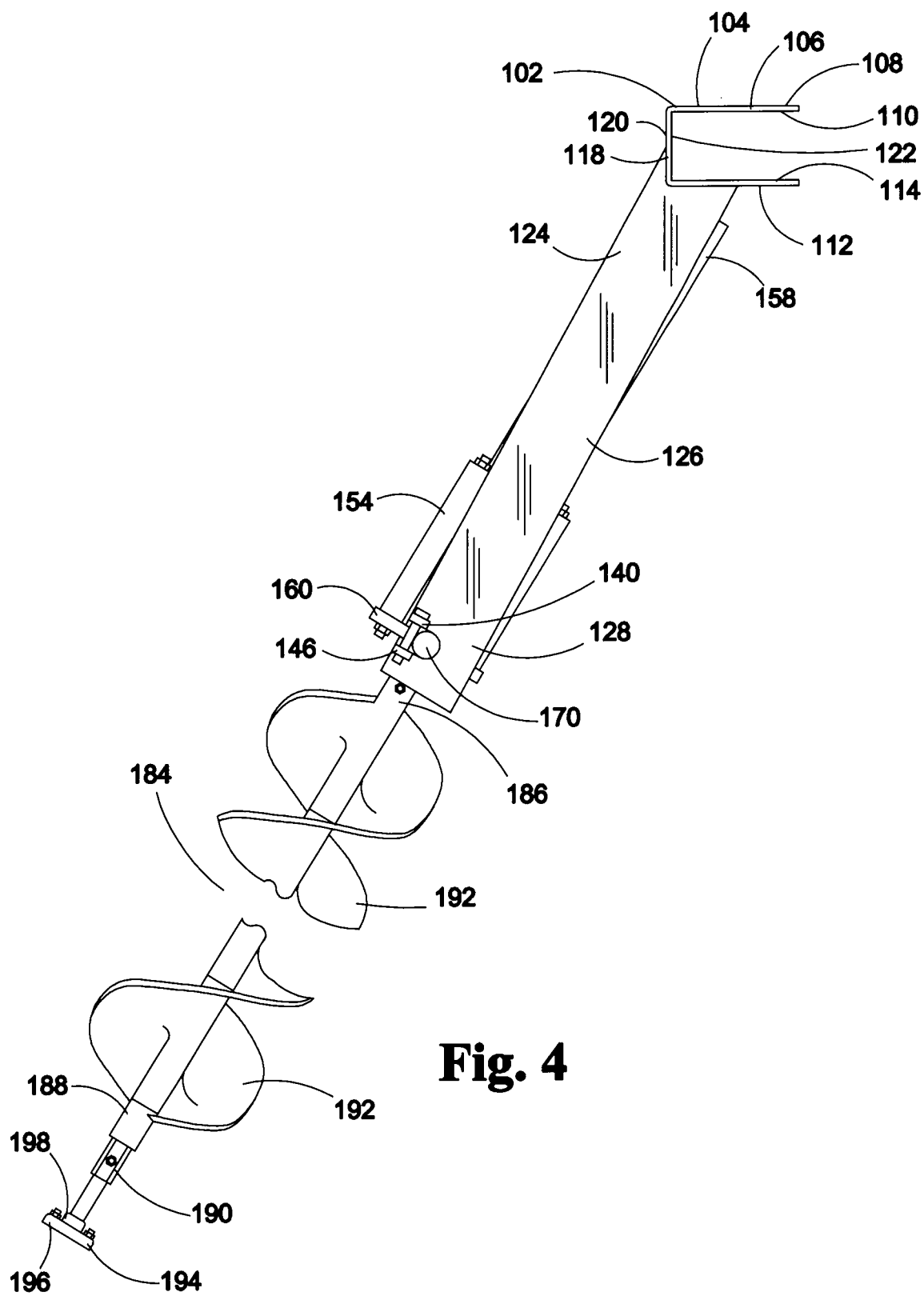
FIG. 4 is a side elevation view of the first bracket according to the preferred embodiment showing the interlocking segments of the sleeves comprising the auger shaft.

As shown in FIGS. 4 and 6, the first bracket 102 of the preferred embodiment additionally comprises a lower portion 124, the lower portion 124 comprising of at least a first side 126 and a second side 132 and extending downwardly. The first side 126 of the lower portion 124 of the first bracket 102 has an inner surface 128 and an outer surface 130 which extend downwardly. As shown in FIG. 6, the first side 126 additionally comprises a slot 138, the slot 138 extending upwardly. Further, the outer surface 128 of the first side 126 of the lower portion 124 of the first bracket 102 additionally comprises a first eye bracket 140 having an opening at a first end 142 and a second end 144 and a second eye bracket 146 having an opening at a first end 148 and a second end 150. The first eye bracket 140 is substantially joined with the outer surface 128 of the first side 126 and is located proximal to the side of the slot 138 most proximal to the upper portion 104 of the first bracket 102. Further, the second eye bracket 146 is substantially joined with the outer surface 128 of the first side 126 and is located proximal to the side of the slot 138 most distal to the upper portion 104 of the first bracket 102. Both the first eye bracket 140 and second eye bracket 146 are oriented such that the first end 142 and second end 144 of the first eye bracket 140 are parallel to the first end 148 and second end 150 of the second eye bracket 146.

Referring again to FIG. 6, the second side 132 of the lower portion 124 of the first bracket 102 comprises an inner surface 136 and an outer surface 134 and extends downwardly. The second side 132 additionally comprises a slot 152, the slot 152 extending upwardly. The outer surface 134 of the second side 132 of the lower portion 124 of the first bracket 102 additionally comprises a first eye bracket 141 having openings at a first end 143 and a second end 145 and a second eye bracket 147 having openings at a first end 149 and a second end 151. The first eye bracket 141 is substantially joined with the outer surface 134 of the second side 132 of the lower portion 124 of the first bracket 102, proximal to the side of the slot 152 most proximal to the upper portion 104 of the first bracket 102. Further, the second eye bracket 147 is substantially joined with the outer surface 134 of the second side 132, proximal to the side of the slot 152 most distal to the upper portion 104 of the first bracket 102. Further, both the first eye bracket 141 and second eye bracket 147 are oriented such that the first end 143 and second end 145 of the first eye bracket 141 are parallel to the first end 149 and second end 151 of the second eye bracket 147.

Figure 5A:
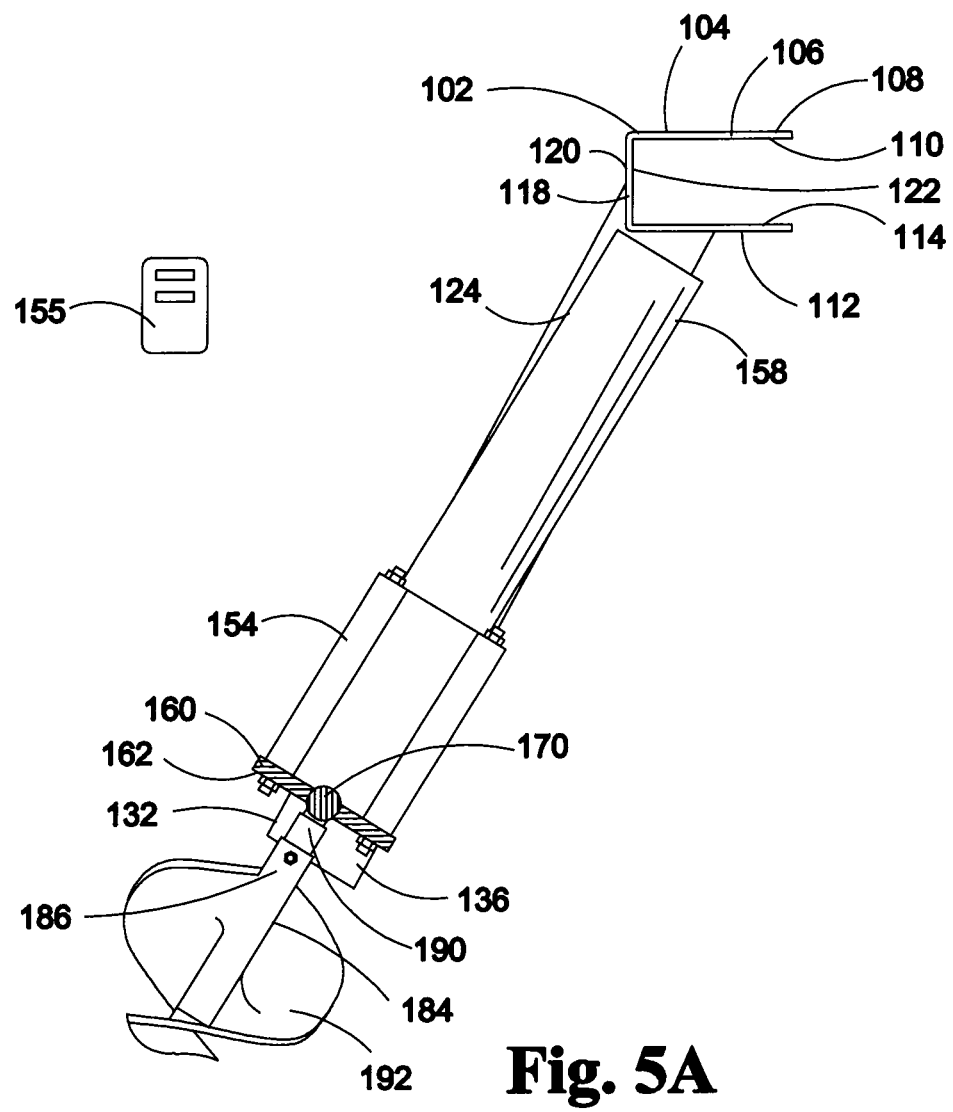
FIG. 5A is a side elevation view of the first bracket, joint, and drive means of FIG. 4, wherein the drive means are capable of being operated by wireless control and the first side of the lower portion of the first bracket is removed to show the joint.
Figure 5B:
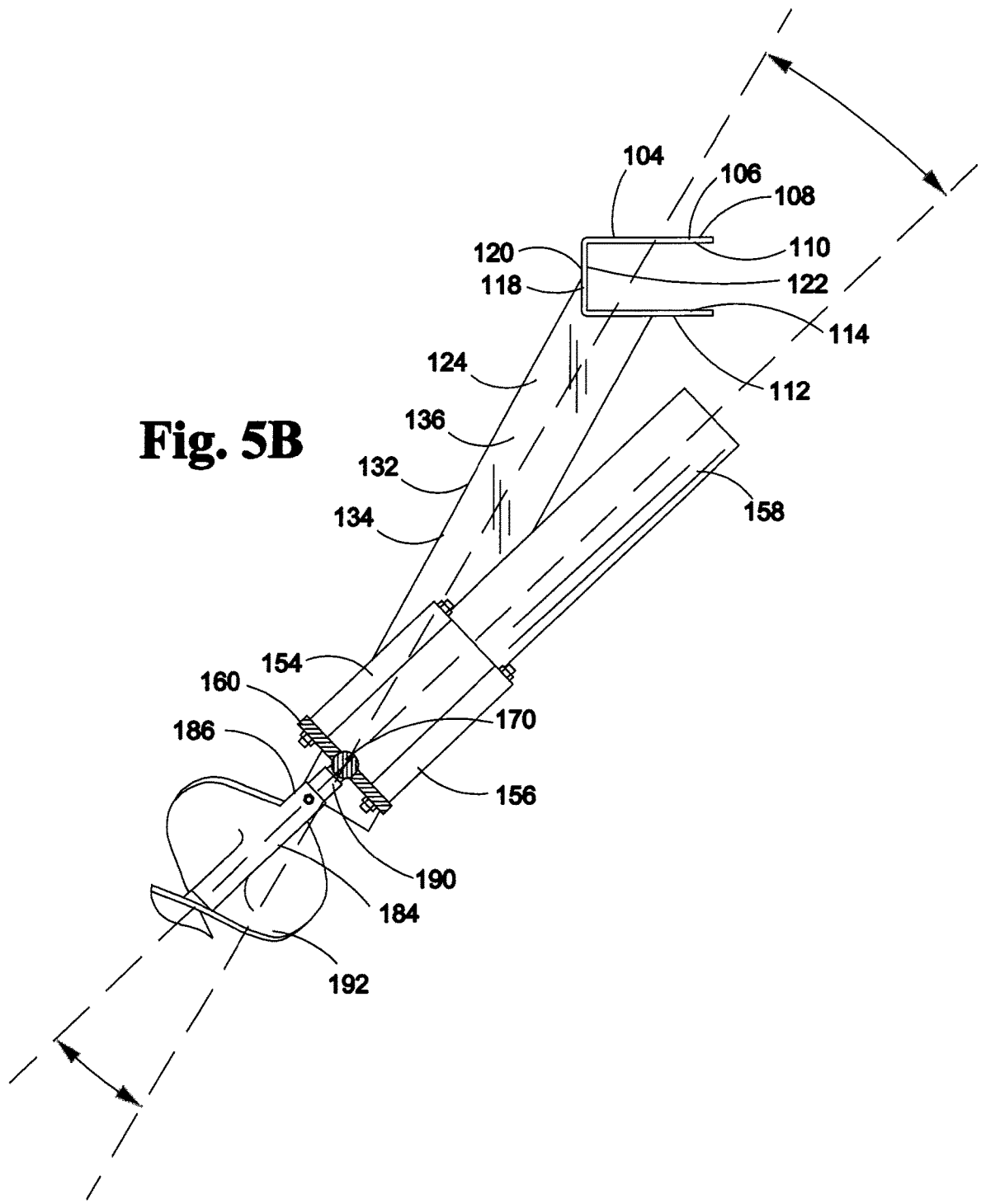
FIG. 5B is a side elevation view of the first bracket, second bracket, and drive means of FIG. 5A, wherein the first side of the lower portion of the first bracket is removed to show horizontal pivoting of the joint as well as the corresponding angle taken upon by the drive means and auger shaft.
Figure 5C:
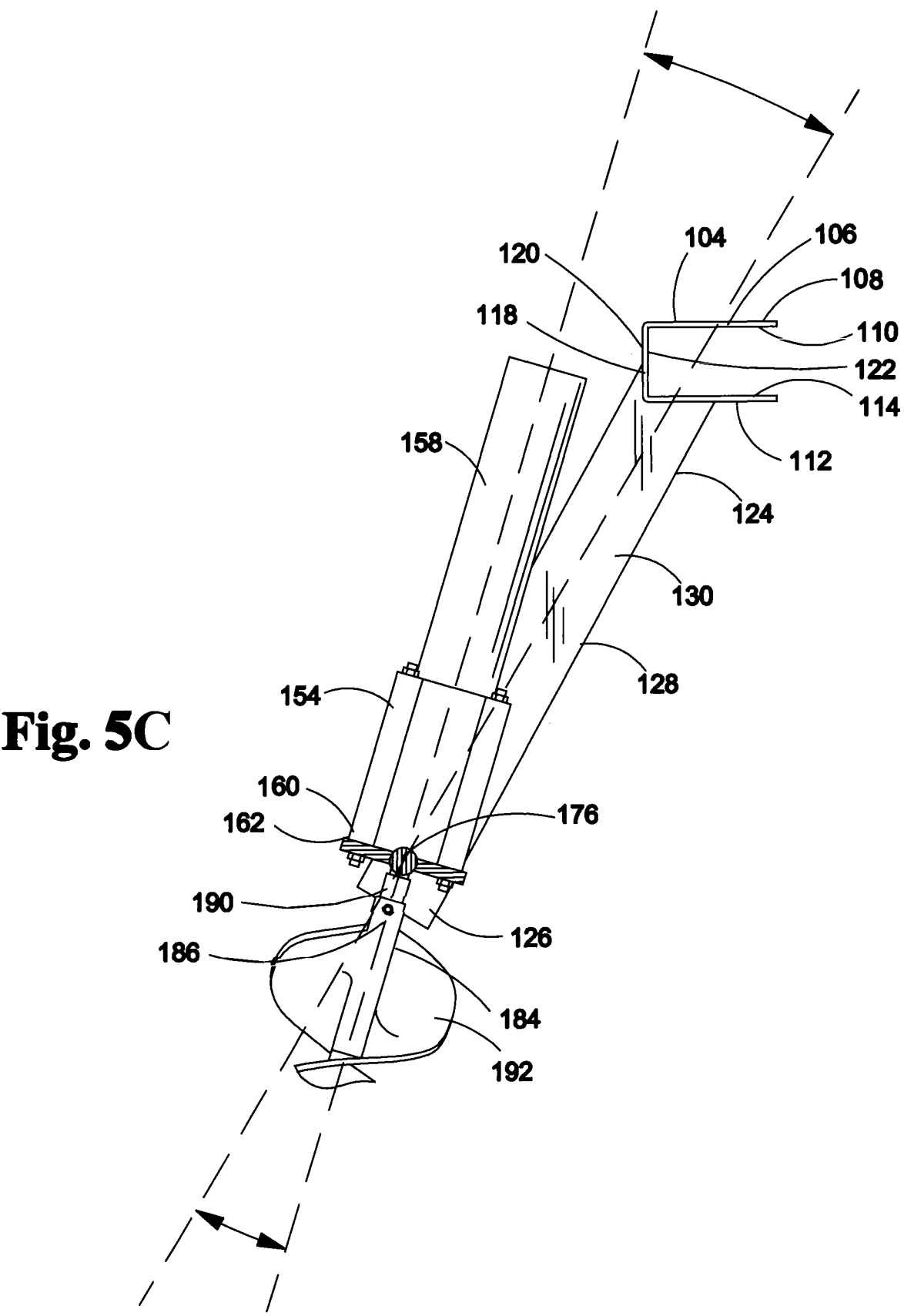
FIG. 5C is a side elevation view of the opposite side of the first bracket, joint, and drive means of FIG. 5A, wherein the second side of the lower portion of the first bracket is removed to show horizontal pivoting of the joint as well as the corresponding angle taken upon by the drive means and auger shaft.

As shown in FIGS. 3, 5A, and 6, the preferred embodiment of the apparatus 100 additionally comprises a joint 160. The joint 160 comprises a plate 162 having a first surface 164 and a second surface 166. The plate 162 of the preferred embodiment has a width and height less than the distance between the inner surface of the first side 130 and the inner surface of the second side 136 of the lower portion 124 of the first bracket 102. The plate 162 further comprises a hole 168 in the center of the plate, 162 a first cylinder 170 having a first end 174 and a second end, 172 and a second cylinder 176 having a first end 180 and a second end 178. As shown in FIG. 6, the first end 174 of the first cylinder 170 is proximal to the hole 168 of the plate 162 and the second end 172 of the first cylinder 170 is distal to the hole 168. Further, the first end 180 of the second cylinder 176 is proximal to the hole 168 of the plate 162 and the second end 178 is distal to the hole 168. Both first cylinder 170 and the second cylinder 176 have diameters of a size less than the width of the slot 138 of the first side 126 of the lower portion 124 of the first bracket 102 and less than the width of the slot 152 of the second side 132 of the lower portion 124 of the first bracket 102. The first cylinder 170 is substantially joined with the second surface 166 of the plate 162 such that the second surface 166 is tangential to the first cylinder 170. The second cylinder 176 is substantially joined with the second surface 166 of the plate 162 such that the second surface 166 is tangential to the second cylinder 176. Additionally, both the first cylinder 170 and the second cylinder 176 are oriented such that the first end 174 and second end 172 of the first cylinder 170 are parallel to the first end 180 and the second end 178 of the second cylinder 176. The second end 172 of the first cylinder 170 and the second end 178 of the second cylinder 176 are equidistant from the center of the hole 168 of the plate 162. Both the second end 172 of the first cylinder 170 and the second end 178 of the second cylinder 176 extend outwardly such that the distance between the second end 172 of the first cylinder 170 and the second end 178 of the second cylinder 176 is greater than the distance between the outer surface 128 of the first side 126 and outer surface 134 of the second side 132 of the lower portion 124 of the first bracket 102. As shown in FIG. 6 the joint 160 is capable of being substantially joined with the lower portion 124 of the first bracket 102 such that the first cylinder 170 of the joint 160 is received by the slot 138 of the first side 126 of the lower portion 124 of the first bracket 102 and the second cylinder 176 of the joint 160 is received by the slot 152 of the second side 132 of the lower portion 124 of the first bracket 102. Further, the joint 160 may be secured to the lower portion 124 of the first bracket 102 by using a first pin 182 and a second pin 183. Specifically, as shown in FIG. 4, the first pin 182 may be inserted through the cylindrical openings of both the first eye bracket 140 and second eye bracket 146 on the outer surface 128 of the first side 126. Further, the second pin 183 may be inserted through the cylindrical openings of both the first eye bracket 141 and second eye bracket 147 on the outer surface 134 of the second side 132. As shown in FIGS. 5B and 5C, receipt of the first cylinder 170 of the joint 160 in slot of the first side 138 and the second cylinder 176 of the joint 160 in the slot of the second side 152 of the lower portion 124 of the first bracket 102 allows the joint 160 to be horizontally pivoted to achieve the desired angle.

The preferred embodiment of the apparatus 100 additionally comprises a drive means 154 having a first end 156 and a second end 158. In the preferred embodiment, the drive means 154 has a width and height equal to or less than the width and height of the plate 162 of the joint, 160 and a length being less than the length of the first side 126 and the second side 132 of the lower portion 124 of the first bracket 102. Accordingly, the entirety of the drive means 154 may be positioned between the inner surface of the first side 130 and the inner surface of the second side 136 of the lower portion 124 of the first bracket 102. As shown in FIGS. 3 and 5A, the drive means 154 of the preferred embodiment comprises an electric motor. The first end 156 of the drive means 154 is substantially joined with the first surface 164 of the plate 162 of the joint 160 by using standard bolts that are received by the drive means 154. However it should be appreciated by those of skill in the art that any means sufficient to secure the drive means 154 to the joint 160 may be used without departing from the scope of the invention. As shown in FIGS. 5B and 5C, when substantially joined with the joint 160, the position of the drive means 154 will change in accordance with the adjustment of the joint 160. In the preferred embodiment of the invention, the electric motor is powered from a battery and as such is capable of operation when the hopper trailer 300 is not in motion. Further, the electric motor of the preferred embodiment of the invention is capable of being operated by wireless control 155 and allows the apparatus 100 to be used without making physical contact with the drive means 154 of the apparatus 100.

As shown in FIGS. 2-5C, the preferred embodiment of the apparatus 100 additionally comprises an auger shaft 184 having a first end 186 and a second end 188 and capable of being adjusted to a desired length. Further, in the preferred embodiment, the auger shaft 184 comprises an internal shaft 190 and an outer sleeve having fighting 192. In the preferred embodiment of the invention, the outer sleeve having flighting 192 is made of a polymer material. However, it should be appreciated by those skilled in the art that the outer sleeve having fighting 192 may be made of any material having sufficient strength to endure operation of the apparatus 100 without departing from the scope of the invention. As shown in FIG. 4 the internal shaft 190 of the preferred embodiment comprises a length of metallic tubing which may be cut to the desired length during the manufacturing process or by the end consumer. However, it should be appreciated by those skilled in the art that the internal shaft may be hollow or solid and may be comprised of any material of sufficient strength to support the operation of the apparatus 100 without departing from the scope of the invention. In the preferred embodiment of the invention, the internal shaft 190 is the only element that requires alteration in order for the apparatus 100 to be retrofitted to any existing hopper trailer 300. However, it should be appreciated by those skilled in the art that alternative means such as telescoping shafts, folding shafts, or motorized extending shafts may be used to adjust the length of the internal shaft 190 without departing from the scope of the invention. Referring again to FIG. 4, the outer sleeve having fighting 192 is comprised of segmented sections of uniform length. The sections of the outer sleeve having flighting 192 are capable of being substantially joined with one another to achieve a desired length. These sections of outer sleeve having flighting 192 are further capable of receiving the internal shaft 190 as shown in FIG. 4. In the preferred embodiment of the invention, the length of the sections of sleeve having flighting 192 is less than the length of the internal shaft 190. Further, the first end 186 of the auger shaft 184 interacts with the drive means 154 of the apparatus 100 by substantially joining the internal shaft 190 with the drive means 154. However, it should be appreciated by those skilled in the art that any means that does not substantially interfere with the operation of the drive means 154 may be used to substantially join the auger shaft 184 to the drive means 154 without departing from the scope of the invention. As shown in FIG. 5A, the auger shaft 184 passes through the hole 168 of the joint 160 before being substantially joined with the drive means 154. Further, the auger shaft 184 is substantially joined with the drive means 154 such that operation of the drive means 154 will result in the auger shaft 184 being rotated upon a longitudinal axis. Referring to FIGS. 5B and 5C, because of the joinder of the of drive means 154 with the joint 160, horizontal pivoting of the joint 160 will cause the drive means 154, joined with the auger shaft 184, to take on a corresponding, vertically opposite angle. The effect of these features working in tandem allows for the lower end 188 of the auger shaft 184 to be adjusted to a variety of desired angles.

As shown in FIGS. 2, 3, and 4, the apparatus 100 additionally comprises a second bracket 194 being capable of receiving and being substantially joined with the lower end 188 of the auger shaft 184 of the apparatus 100. In the preferred embodiment, the second bracket 194 comprises a flange bearing and lock collar 198 as is known in the art. The flange bearing comprises a structural housing 196 containing a cylindrical bearing assembly wherein the auger housing 196 retains and allows the bearing assembly to be positioned at multiple angles. The bearing assembly is further capable of receiving the auger shaft 184 of the apparatus 100. As shown in FIG. 4, the auger shaft 184 may by substantially joined with the bearing assembly using the lock collar 198. As is known in the art, the lock collar 198 comprises concentric cylinders with a central cavity and a set screw. The lock collar 198 may be placed on the internal shaft 190 at the lower end 188 of the auger shaft 184 and secured at the desired location by turning the set screw in order to compress the concentric cylinders and contact the internal shaft 190. As shown in FIG. 4, the second bracket 194 may be substantially joined with the inside of a hopper trailer 304. In the preferred embodiment, the second bracket 194 is located proximal to the side of the hopper outlet 306 most distal from the first bracket 102. However, it should be appreciated by those of skill in the art that any means sufficient for receiving the auger shaft 184 and securing the auger shaft 184 to the interior of a hopper trailer 304 at multiple angles may be used without departing from the scope of the invention.

Referring to FIGS. 4, 5B, 5C, and 6, the preferred embodiment of the invention allows the manufacturer or end user to adjust and customize the apparatus 100 in order to allow the apparatus 100 to be installed in existing hopper trailers 300 having standard or non-standard dimension. Specifically, the addition of vibration reducing material 200 (as shown in FIG. 6) not only reduces vibration that could damage that apparatus 100 over time, but also allows the thickness of the first side 106, second side 112, and third side 118 of the upper portion 104 of the first bracket 102 to be adjusted. Changing the thickness of the first side 106, second side 112, and third side 118 allows the interior volume of upper portion 104 of the first bracket 102 to be altered in order to more closely match the dimensions of the hopper trailer rim 302 with which it is substantially joined. Further, as depicted in FIGS. 5B and 5C, the inclusion of the joint 160 being substantially joined with both the drive means 154 and the first bracket 102 allows the drive means 154 to be pivoted in order to achieve the desired angle. The horizontal pivoting occurs about the axis created by both the first cylinder 170 and the second cylinder 176 of the joint 160. Further, because the auger shaft 184 is substantially joined with the drive means 154, horizontal pivoting of the drive means 154 causes the auger shaft 184 to adopt a vertically opposite angle. Further, as the second bracket 194 is substantially joined with the lower end 188 of the auger shaft 184 (also shown in FIGS. 2, 3, and 4), the point at which the apparatus 100 may be joined with the interior of the hopper trailer 304 is adjustable to any point along the length of the arc created by the lower end 188 of the auger shaft 184 during pivoting of the joint 160. Additionally, the ability of the second bracket 194 to receive the lower end 188 of the auger shaft 184 at various angles allows the apparatus 100 to be joined with the interior of hopper trailer 304 regardless of the angle of the surface with which it may be substantially joined. As discussed, the length of the auger shaft 184 may also be adjusted to achieve the desired configuration for installation. Specifically, the length of the auger shaft 184 may be adjusted by altering the length of the internal shaft 190 of the auger shaft 184 to the appropriate the distance found between the second bracket, 194 as attached to the interior of the hopper trailer, 304 and the drive means 154 and adding the desired number of segmented sleeves having flighting 192 (as shown in FIG. 4). The use of these adjustable elements allows the apparatus 100 to achieve joinder with the interior of a hopper trailer 304 regardless of the interior dimensions of the hopper trailer 304.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly the embodiments of the invention set forth above are intended to be illustrative, not limiting. Persons skilled in the art will recognize that changes may be made inform and detail without departing from the spirit and scope of the invention. Therefore, the invention is intended to embrace all known or earlier developed alternatives, modifications, variations, improvements, and/or substantial equivalents.

What is claimed is:

1. An apparatus for starting the flow of a compacted material from a hopper trailer comprising:
    a. means for substantially joining the apparatus with a hopper trailer having a bottom, four walls, and an open top featuring an interior rim, wherein said means interface with said interior rim;
    b. an auger shaft having flighting, said auger shaft extending downwardly towards the bottom of a hopper trailer and capable of being substantially joined with the bottom of said hopper trailer wherein said auger shaft is not enclosed; and
    c. a drive means, said drive means capable of being substantially joined with said auger shaft and rotating said auger shaft on a longitudinal axis, thereby creating a cavity in the compacted material and assisting in the movement of said compacted material downwardly towards the bottom of said hopper trailer.

2. The apparatus of claim 1 wherein said means for substantially joining the apparatus with the inside rim of a hopper trailer comprises a bracket.

3. The apparatus of claim 1 wherein the apparatus additionally comprises a joint, said joint capable of being substantially joined with said drive means and said means for substantially joining the apparatus with said inside rim of said hopper trailer.

4. The apparatus of claim 3 wherein said joint is capable of being adjusted to multiple angles, wherein the adjustment of said joint causes said drive means and said auger shaft to take on a vertically opposite angle.

5. The apparatus of claim 1 wherein said auger shaft is substantially joined with the interior of the hopper trailer by a second bracket.

6. The apparatus of claim 5 wherein said second bracket is capable of receiving said auger shaft at multiple angles.

7. The apparatus of claim 1 wherein said drive means may be operated by wireless control.

8. The apparatus of claim 1 wherein said drive means comprises an electric motor.

* * * * *